United States Patent [19]
Mehrgardt

[11] Patent Number: 4,713,828
[45] Date of Patent: Dec. 15, 1987

[54] DATA REDUCTION CIRCUIT

[75] Inventor: Soenke Mehrgardt, March, Fed. Rep. of Germany

[73] Assignee: Deutsche ITT Industries GmbH, Freiburg, Fed. Rep. of Germany

[21] Appl. No.: 847,646

[22] Filed: Apr. 3, 1986

[30] Foreign Application Priority Data
Apr. 3, 1985 [EP] European Pat. Off. ........ 85104051.9

[51] Int. Cl.$^4$ ............................................. H04B 14/06
[52] U.S. Cl. ................................. 375/30; 332/11 D; 358/135
[58] Field of Search ................. 375/27, 28, 30, 33; 332/11 R, 11 D; 340/347 AD; 358/135, 136

[56] References Cited
U.S. PATENT DOCUMENTS

| | | | |
|---|---|---|---|
| 4,255,763 | 3/1981 | Maxemchuk et al. | 358/135 |
| 4,375,013 | 2/1983 | Cointot et al. | 375/27 |
| 4,460,923 | 7/1984 | Hirano et al. | 358/136 |
| 4,541,102 | 9/1985 | Grallert | 375/30 |
| 4,562,468 | 12/1985 | Koga | 375/27 |

Primary Examiner—Robert L. Griffin
Assistant Examiner—Stephen Chin
Attorney, Agent, or Firm—T. L. Peterson

[57] ABSTRACT

In this circuit, the subcircuits substantially contributing to the computation time of the time-critical loop are only a subtracter, a quantizer and a delay element. The digital video signals whose number of bits is to be reduced can thus have clock rates of 17 to 20 MHz if the circuit is implemented using CMOS or N-channel MOS technology.

2 Claims, 2 Drawing Figures

DATA REDUCTION CIRCUIT

BACKGROUND OF THE INVENTION

The invention pertains to a data reduction circuit for reducing the number of bits of digital video signals with a differential pulse code modulator.

A data reduction circuit of this kind is described in an article in the periodical "Elektrisches Nachrichtenwesen", Vol. 58, 1984, pp. 447 to 449. The author of that article estimates that the prior art arrangement permits a clock rate of about 10 MHz and can be implemented with a single integrated circuit if 2-μm CMOS technology is used. Aside from the fact that a CMOS process with 2-μm geometry is currently available only in research and development laboratories and, thus, is not yet suited for volume production of semiconductor devices, the maximum possible clock rate of about 10 MHz is too low if such data reduction circuits are to be used in circuits for eliminating flicker in a television picture. This requires higher clock rates which range from about 17 MHz to 20 MHz.

In the prior arrangement, the time-critical loop, which limits that maximum clock rate, contains a subtracter, an adder, a limiter, and a quantizer. This loop must perform the necessary computations within one period of the clock signal, which is only about 100 ns in the prior art arrangement if correspondingly fast adder/subtracter stages are used.

SUMMARY OF THE INVENTION

In accordance with the invention the time-critical loop is improved so that a shorter computation time corresponding to the intended clock rate of about 17 to 20 MHz is achieved. A processing speed about twice that of the prior art arrangement is achieved by eliminating the need for the adder and the limiter in the time-critical loop, so that the latter consists only of the quantizer and the substracter.

BRIEF DESCRIPTION OF THE DRAWING

The invention will be better understood from a reading of the following detailed description in conjunction with the drawing in which.

DETAILED DESCRIPTION

Figure 1:
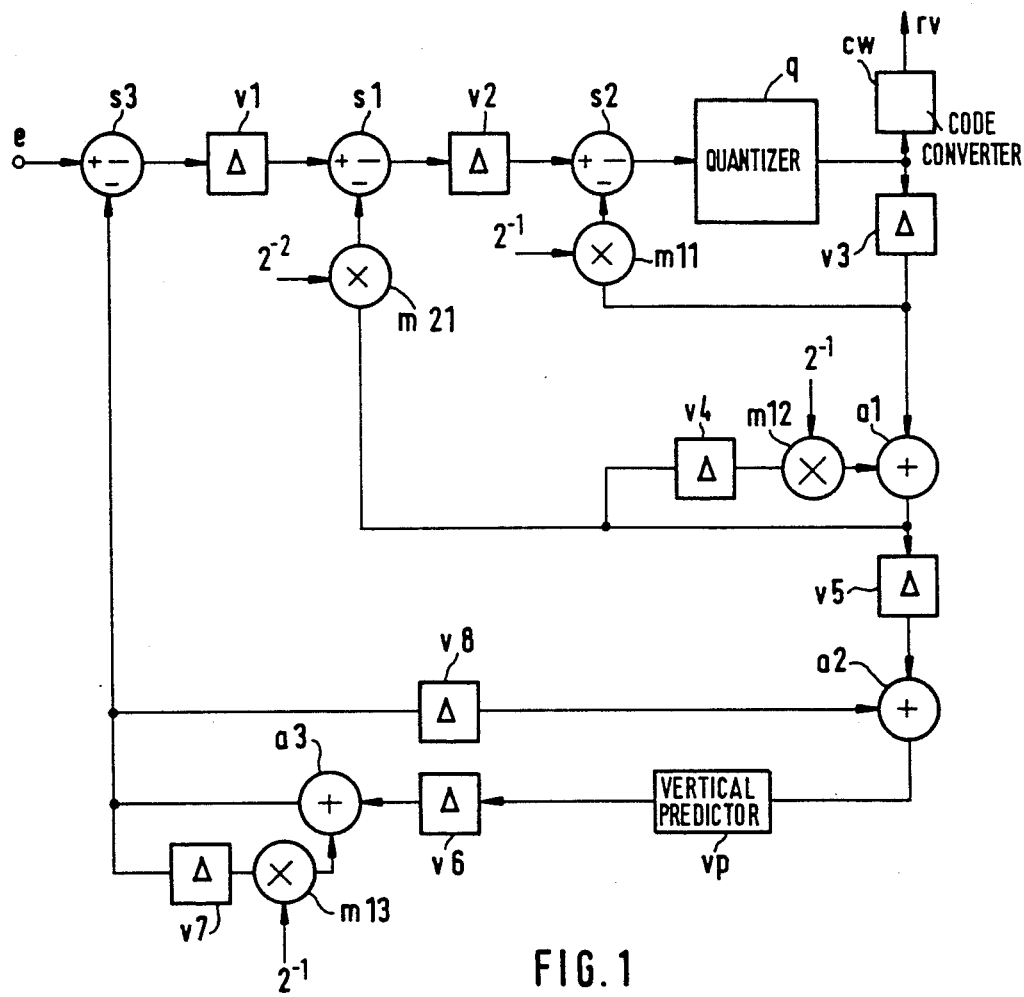
FIG. 1 is a block diagram of an embodiment of the invention.

In the block diagram of FIG. 1, input e receives the input data, i.e., digital video signals, whose number of bits is to be reduced from, for example, 8 bits to 4 bits. In the arrangement described in the aforementioned article, the input data is fed to the first delay element v1, whose output is coupled to the minuend input of the first subtracter s1. From the output of the latter, they pass through the second delay element v2 and are applied to the minuend input of the second subtracter s2. According to a feature of the invention, in FIG. 1, the input data, which changes at the rate of a clock signal, is fed to the minuend input of the third subtracter s3, whose output is applied to the input of the first delay element v1.

The output of the second subtracter s2 is coupled to the input of the quantizer q, which may be of a design as described in the aforementioned article, i.e., which is preferably a read-only memory with a quantization table for 16 values. Its output is connected through the code converter cw to the output for the data-reduced output signal, rv and, on the other hand, directly to the input of the third delay element v3. The fundamental idea of the invention lies in this direct connection between the quantizer q and the delay element v3, because this eliminates the need for the adder and the limiter located there in the prior art arrangement, so that considerable computation time can be saved in the time-critical loop. The output of the third delay element v3 is also connected to the subtrahend input of the second subtracter s2 through the first $2^{-1}$ multiplier m11.

The output of the first adder a1 is coupled through the first $2^{-2}$ multiplier m21 to the subtrahend input of the first subtracter s1, through the fourth delay element v4 and the second $2^{-1}$ multiplier m12 to the second input of this first adder, and through the fifth delay element v5 to the first input of the second adder a2.

The output of the second adder a2 is fed through the vertical predictor vp and the sixth delay element v6 to the first input of the third adder a3, which has its output connected to its second input via the seventh delay element v7 and the third $2^{-1}$ multiplier m13. This output is also connected directly to the subtrahend input of the third subtracter s3, and through the eighth delay element v8 to the second input of the second adder a2.

The delay provided by each of the first to the seventh delay elements v1—v7 is equal to the period of the clock signal, while that of the eighth delay element v8 is four times the clock period.

The vertical predictor bases its prediction, using powers of two as weighting factors on the data word preceding a considered data word of a line of the television picture, on the corresponding data word of the preceding line and on the data word of the preceding line corresponding to the considered data words.

Figure 2:
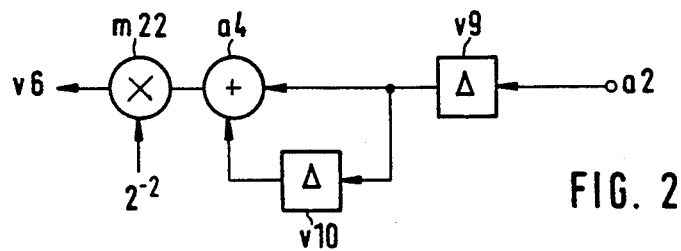
FIG. 2 is a block diagram of a preferred embodiment of a subcircuit of FIG. 1.

FIG. 2 shows a preferred embodiment of the vertical predictor vp of FIG. 1. In the direction of signal flow, the ninth delay element v9, whose delay is 5 periods of the clock signal shorter than the duration of one line of the television picture, is followed by the fourth adder a4 and the second $2^{-2}$ multiplier m22, with the output of the ninth delay element v9 connected to the second input of the fourth adder a4 via the tenth delay element v10, which produces a delay equal to the period of the clock signal.

While the signal-carrying lines between the individual subcircuits are shown in the figures of the accompanying drawing as simple interconnecting leads, the latter symbolize busses, because the individual subcircuits process data words in parallel, which follows from the above-mentioned operating speed of data reduction circuit in accordance with the invention. The term "parallel signal processing" as used here includes parallel signal processing by the so-called pipeline technique, in which the individual bits of a digital word within the clock system formed by the clock signal are processed with a delay of at least one clock period relative to the other bits.

The circuit in accordance with the invention is suited for implementation not only in the above-mentioned CMOS technology but also in N-channel MOS technology with 2-μm geometry.

What is claimed is:

1. Data reduction circuit for reducing the number of bits of digital video signals with a differential pulse code modulator comprising:

a vertical predictor;
a quantizer; and
a code converter for converting the output data of said quantizer into an output signal with the reduced number of bits; and the input data is fed to a first delay element, said input data changing at the rate of a clock signal;

said first delay element having its output coupled to the minuend input of a first subtracter;

the output of said first subtracter being connected via a second delay element to the minuend input of a second subtracter having its output coupled to the input of the quantizer;

the output of said quantizer being connected to the input of a third delay element having an output coupled to the first input of a first adder and through a first $2^{-1}$ multiplier to a subtrahend input of said second subtracter;

the delay produced by each of said first, second and third delay elements being equal to the period of said clock signal;

said first delay element is preceded by the minuend-input-output path of a third subtracter;

the output of said first adder is coupled through a fourth $2^{-2}$ multiplier to the subtrahend input of said first subtracter, through a fourth delay element and a second $2^{-1}$ multiplier to the second input of said first adder, and through a fifth delay element to the first input of a second adder having its input connected to the input of said vertical predictor;

the output of said vertical predictor is coupled through a sixth delay element to the first input of a third adder whose output is connected to the subtrahend input of said third subtracter, through a seventh delay element and a third $2^{-1}$ multiplier to the second input of said third adder (a3), and through an eighth delay element to the second input of said second adder (a2); and the delay of each of said fourth, fifth, sixth, and seventh delay elements is equal to that of said first delay element, while the delay of said eighth delay element is four times that of said first delay element.

2. A data reduction circuit in accordance with claim 1, wherein: said vertical predictor comprises a ninth delay element followed by a fourth adder and a second $2^{-2}$ multiplier, the delay of said ninth delay element being five periods of said clock signals shorter than one line period, and the output of said ninth delay element being connected to the second input of said fourth adder via a tenth delay element providing a delay equal to that of the first delay element.

* * * * *